Nov. 7, 1944.　　　　　　L. A. FRY　　　　　　2,362,126
FRUIT CUTTING AND FEEDING DEVICE
Filed Dec. 16, 1941　　　2 Sheets-Sheet 1

LAWRENCE A. FRY,
INVENTOR

BY

ATTORNEY.

Nov. 7, 1944.    L. A. FRY    2,362,126
FRUIT CUTTING AND FEEDING DEVICE
Filed Dec. 16, 1941    2 Sheets-Sheet 2
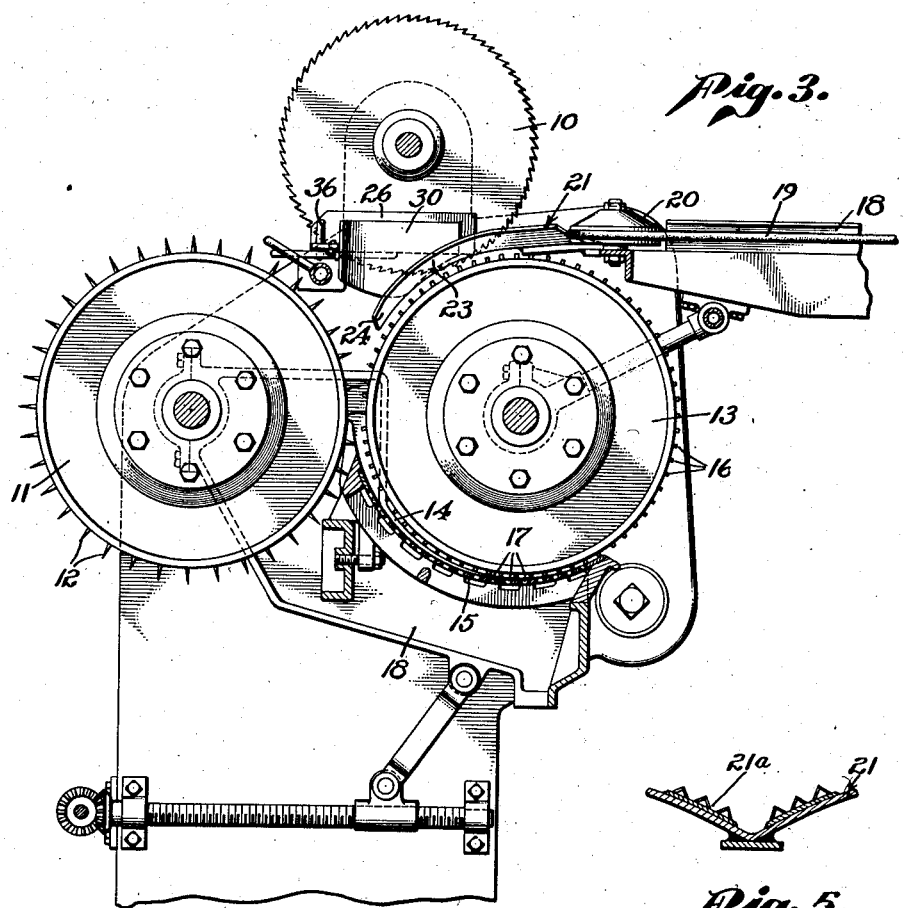
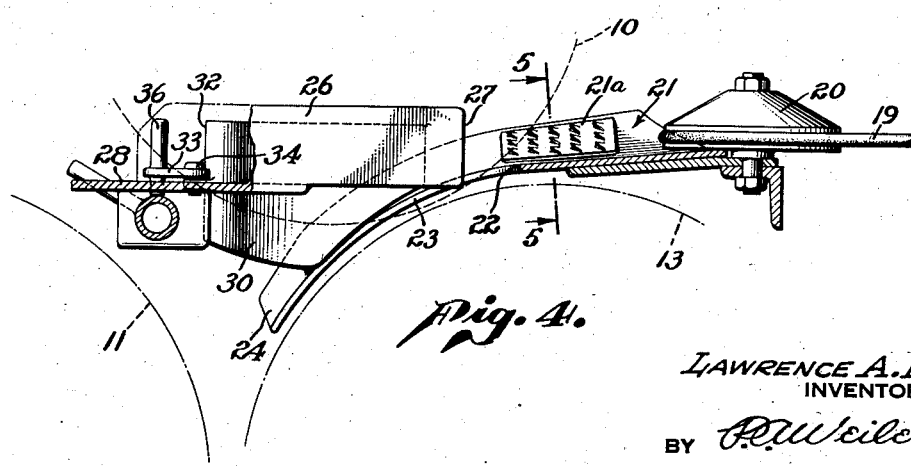
LAWRENCE A. FRY,
INVENTOR
ATTORNEY.

Patented Nov. 7, 1944

2,362,126

UNITED STATES PATENT OFFICE 2,362,126

FRUIT CUTTING AND FEEDING DEVICE

Lawrence A. Fry, Hollywood, Calif., assignor, by mesne assignments, to General Foods Corporation, New York, N. Y., a corporation of Delaware Application December 16, 1941, Serial No. 423,201

10 Claims. (Cl. 146—3)

This invention relates to machines for separating citrus fruits into separate constituents and more particularly to a machine of the type shown in my Patent Number 2,212,066.

Devices of this kind operate by having the fruit and gradually compressing it between two pressure surfaces, the cut surfaces of the fruit halves being pressed against a foraminous surface as the fruit is moved thereover. The juice bearing portion of the fruit is forced into the openings in said surface and is separated from the white rind of the fruit. When the juice and pulp are used for certain purposes, for example, for sale as pure juice, the requirements of purity of the extracted juice are very stringent. For this reason contamination of extracted juice by oil from the rind must be avoided. Because of this fact positive assurance must be had that the fruit is initially positioned between the pressure surfaces with the cut surfaces of the halves facing in the same direction.

In the machine shown in the patent above referred to, the halved fruit is acted upon by two drums, one of them having spaced circumferential rows of spikes for severing the leading edges of the rinds and positioning the halves so as to permit proper flattening of the rinds as the halves pass through the machine. The other drum has cooperating rows of pins which engage the rind and produce sufficient traction on the fruit to cause it to slide along the foraminous surface which is in converging relation with the pinned drum, pressure between the drum and the surface causing passage of the pulp and juices through the openings in the foraminous plate. It can be appreciated that if the fruit enters the space between the two drums to one side or the other of the aligned spikes and pins, the fruit will not be satisfactorily engaged by these pins and spikes. In other words, one of the requirements for satisfactory operation is that the fruit enter a predetermined path of movement.

With the above requirements in mind it is a primary object of the present invention to provide a means for delivering halved fruit into a predetermined path of movement, with the cut surfaces of the fruit halves facing in a predetermined direction.

It is a further object of the present invention to provide a device for delivering fruit halves into a predetermined path of movement with the cut surface of the halves facing in a predetermined direction, which can be adapted to so deliver fruit halves over a wide range of sizes of fruit.

In the machine shown in my prior patent reliance is had upon circumferential grooves in the feeder drum to hold the fruit halves upright as they pass the knife. However, the spinning of the knife and the rotation of the pressure drum acting together upon the fruit sections tend to spin and upset the fruit, making it difficult to control after it has been cut into halves. Accordingly, it is an object of the present invention to maintain the fruit out of contact with the feeder drum as it passes the knife.

It is a further object of the present invention to provide means for preventing the fruit from spinning upon engagement with the cutting edge of the knife.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings:

Figure 3 is a vertical sectional view taken on line 3—3 of Figure 1;

Figure 4 is a section taken on line 4—4 of Figure 2; and,

Figure 5 is a section taken on line 5—5 of Figure 4.

Figure 1:
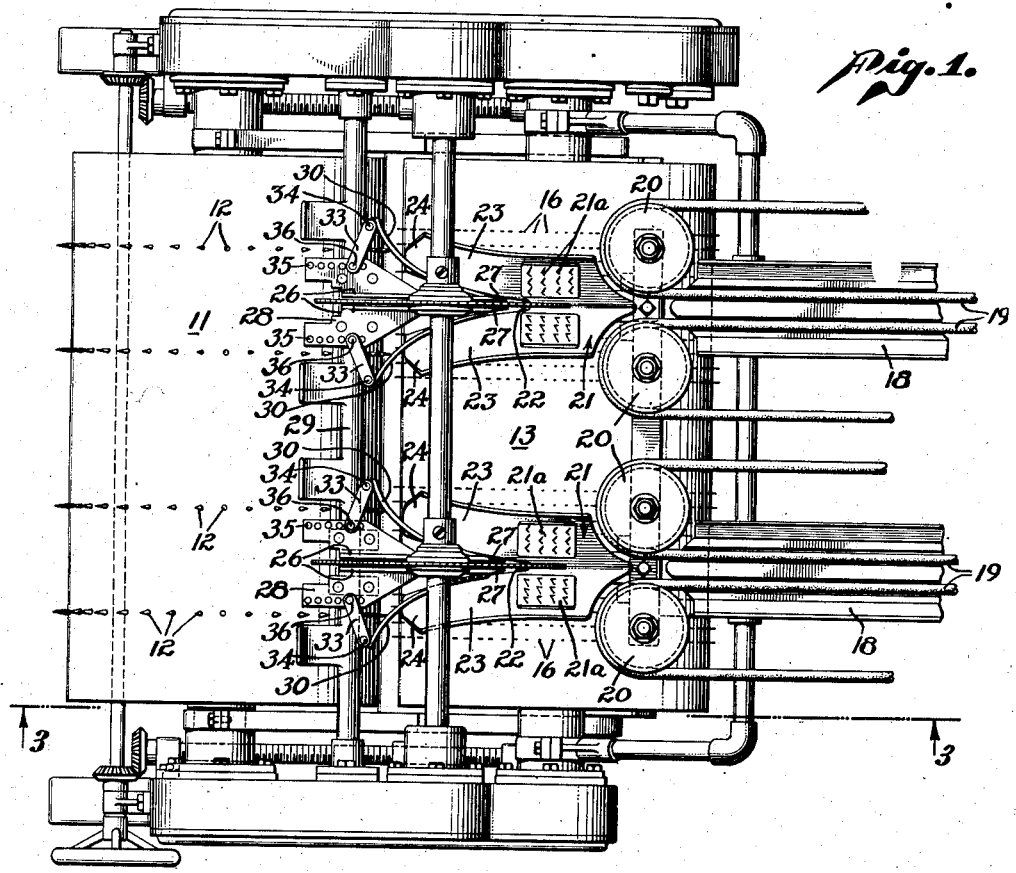
Figure 1 is a top plan view of a machine embodying the present invention.

The machine upon which the present invention is shown consists essentially of four elements which cooperate to separate the juices and pulp of the fruit from the rinds. In order to sever the fruit into halves a knife or rotary cutter 10 first engages the fruit during its passage into the machine. After the halves leave this knife they are guided between a pair of rollers or drums 11 and 13, which perform an initial squeezing operation on the fruit and prepare it for subsequent operations. These two drums also have functions apart from this squeezing effect. The drum 11, which will be referred to as the feeder drum, has a plurality of projecting pins or spikes 12 thereon which, by virtue of the higher peripheral speed of the drum 11 as compared with the other drum 13, slit the leading edges of the fruit and properly position the fruit as it passes between the two drums. The fruit being, by virtue of the squeezing operation between the drums 11 and 13, slightly flattened and, by virtue of the slitting operation capable of being further flattened, passes through a converging passage 14 which is formed by a foraminous member or screen 15, which is disposed around part of the periphery of the drum 13 and at a varying distance therefrom. The pins 16 on the drum 13 are merely for the purpose of assuring sufficient traction by the drum 13 on the fruit to carry the fruit through this converging passage 14. It can be appreciated that movement of the fruit through this converging passage gradually flattens out the rind and forces the pulp and juice through openings 17 in the curved pressure member 15, the juice and pulp running into a collection trough 18 from whence it is withdrawn for further treatment.

It can be appreciated that if the halved fruit should be delivered between the drums 11 and 13 in any position with too great a departure from tangency between the cut surface of the fruit and the drum 11, the fruit might be squeezed in a direction which would result in its doubling up rather than flattening out. Such squeezing action would result in clogging of the machine, and the offending fruit would have to be removed from the space between the rollers 11 and 13 before operation could continue. In addition to this, improper positioning of the fruit as it enters the space between the drums 11 and 13 would also result in doubling under of the leading edge of the fruit, thus bringing the rind in contact with the perforated pressure surface 15, resulting in contamination of the extracted juices by particles of the rind and rind oils. Additionally, it can be seen from an examination of Figure 1, that if the fruit halves are delivered to the space between the drums 11 and 13 too much to one side or the other of the circumferential rows of spikes 12, they will not be properly acted upon by the spikes 12, and furthermore may miss the pins 16 entirely. The foregoing mishaps are obviated by the present invention, which assures that the fruit is approximately centered on the spikes 12, or in other words, that it is delivered to the predetermined paths of movement defined between the spikes 12 and pins 16, and also that the cut surfaces of the fruit halves are facing in the proper direction as they enter said paths of movement.

In the form of the invention shown in the drawings, means is provided for presenting the whole fruit to the severing knife 10 and for guiding the halved fruit from the knife 10 to the space between the drums 11 and 13. In order to assure that the fruit reaches the knife 10 in a proper manner, a conveyor system is utilized to bring the fruit up to the knife in a single line. This conveyor system consists of a chute 18 of sufficient size to contain the largest size of fruit which might be handled. The bottom of this chute has a pair of traveling cables 19 extending along its length. These two cables move with the same linear velocity in a direction towards the knife. The fruit normally rests on these cables in a single line and does not come into contact with the trough. It is thus carried towards the knife by the movement of the cables and the trough is merely to guide it back onto the cables in the event that it leaves them for any reason. The pulleys 20 serve to return the cables to the other end of the conveyor system and the fruit passes over these pulleys onto a chute 21 immediately in front of the knife.

Figure 2:
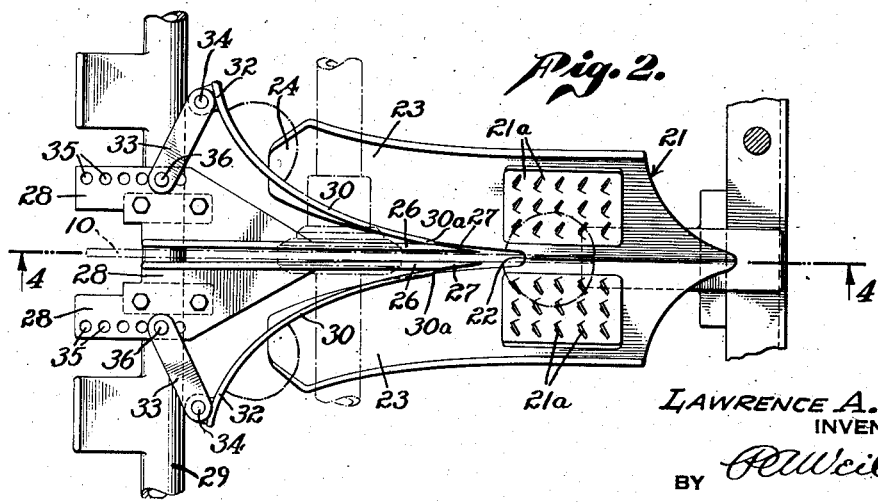
Figure 2 is an enlarged top plan view of one of the devices embodying my invention shown in Figure 1.

The chute 21, as shown best in Figures 2 and 5, is in the form of a shallow V of sufficient extent to guide the fruit to the knife 10. Roughened surfaces 21a are provided on the sides of the chute immediately in front of the knife 10. These surfaces are shown as being formed by a plurality of upstruck points formed in metal sheets or plates secured to the sides of the chute. The points extend toward the knife 10 and serve to prevent the whole fruit from spinning when it comes into engagement with the cutting edge of the rotating knife 10. The chute 21 is bifurcated beyond the point 22, and the legs 23 of the bifurcated portion are curved from the point 22 outwardly from the sides of the knife 10, and are shaped to more or less follow the curvature of the drum 13. It is proposed to support the halved fruit on the legs 23 of the bifurcated portion and guide it to the space between the drums 11 and 13 opposite the rows of spikes 12, the fruit dropping from the ends 24 of the legs 23 in proper position. The means employed for removing the halved fruit from the knife 10 and guiding it down the legs 23 of the chute includes a pair of plates 26, having sharpened forward edges 27 positioned adjacent the sides of the knife 10 so as to lift the halved fruit from contact therewith. The plates 26 are provided with horizontal portions 28 which are supported on a cross member 29 of the machine. As the deflected fruit halves roll or slide down the leg portions 23 they are guided outwardly by a pair of curved deflectors 30 into the space between the drums and in alignment with the spikes 12 and pins 16. As the fruit travels toward these predetermined positions between the drums, the engagement of the deflectors with the cut faces of the fruit turns the fruit into proper position for entrance between the drums with the cut surfaces facing toward the feed drum 11.

The inner ends of the deflectors 30 are secured to the plates 26 adjacent their sharpened edges 27, and are bevelled as at 30a to provide a smooth surface over which the fruit may slide from the sharpened edges 27 onto the deflectors. As heretofore described, the deflectors are curved outwardly from their points of connection with the plates 26 and cooperatively with the leg portions 23 form troughs through which the fruit may slide and roll. For reasons hereinafter described, it is desirable to provide means for adjusting the deflectors toward and away from the leg portions 23. This may be conveniently accomplished by making the deflectors of flexible material and providing means for adjusting and holding their outer ends with respect to the legs 23. A simple means for holding and adjusting the outer ends 32 of the deflectors 30 consists of links 33, each having one end pivoted as at 34 to the deflectors and the opposite end adjustably secured to the horizontal portions 28 of the plates 26. The adjustment of the deflectors may be accomplished by providing a plurality of openings 35 in the plates 27 in which the pins 36 on the links may be selectively positioned.

As it is impossible to predict the exact path the fruit will take for any given setting of pins 36 in holes 35, it becomes necessary to adjust the pins 36 by trial until the proper position is determined. Although the fruit passed through these machines is graded to a certain extent, different runs are made with considerably different sized fruits. It can be appreciated that a grapefruit, for instance, would fall too far away from the deflectors and thus would not be properly centered over the spikes 12 if the deflectors were to be left in the position which is proper for a fruit such as a lemon. This also renders necessary the adjustment of the deflectors 30, although any given adjustment will properly position the fruit through a considerable range of sizes.

The method of operation of the device and the principles upon which it functions should now be clear. The fruit passes along the trough 18, onto the chute 21, where it is severed by the knife 10. The halves of the fruit are picked off the knife by the sharpened edges 27 of plates 26. The fruit halves then slide or roll along the troughs formed between the leg portions 23 and the deflectors 30, with the cut surfaces in contact with the deflectors as heretofore described. When the fruit reaches the ends 24 of the portions 23 of the chute, it drops therefrom into the space between the feeding drum and the pressure drum. At that instant it is approximately in the proper position with respect to the two drums, and is properly related to the spikes on drum 11 and the pins on the drum 13. After this the operation of the machine is as was described above.

I claim:

1. A device for delivering halved fruit into predetermined paths of movement with the cut surfaces of the fruit halves facing in a predetermined direction comprising, a knife for cutting the fruit, means guiding the fruit onto the knife, means forming channels for conducting the fruit away from the knife, including a deflector on each side of the knife engageable with the cut surfaces of the fruit halves, each deflector extending from the knife to a point near a predetermined path of movement and curved to turn the cut surfaces to face in the desired direction, and means for altering the position of the last engaged portion of each of said deflectors in directions transversely of the plane of the knife to control the angles at which different sizes of cut fruit leave the deflectors.

2. A device for delivering halved fruit into predetermined paths of movement with the cut surfaces of the fruit halves facing in a predetermined direction comprising, a knife for cutting the fruit, means guiding the fruit onto the knife, guide means leading the fruit halves from the knife, said guide means including a pair of members forming a channel on each side of the knife for passing the fruit halves, one member of each channel engaging the cut surface of the fruit to position the fruit halves, and means for altering the position of the last-engaged portion of at least one of each pair of members to adjust the channel for different sizes of fruit.

3. A device for delivering halved fruit into predetermined paths of movement with the cut surfaces of the fruit halves facing in a predetermined direction comprising, a knife for cutting the fruit, means guiding the fruit onto the knife, a curved member on each side of the knife supporting said fruit halves, and a deflector extending from each side of the knife to a point near one of the predetermined paths of movement, said deflectors cooperating respectively with said members to form channels for passing the fruit, said deflectors being engageable with the cut surfaces of the fruit halves, and means for altering the position of the last-engaged portion of each of said deflectors in a direction transversely of the plane of the knife to adjust the channel for different sizes of fruit as well as to control the angle at which the fruit enters said paths.

4. A device for delivering halved fruit into predetermined paths of movement with the cut surfaces of the fruit halves facing in a predetermined direction comprising, a knife for cutting the fruit, means guiding the fruit onto the knife, means guiding the fruit halves from the knife to said predetermined paths of movement including a support and a deflector on each side of the knife, said deflectors being curved to turn the cut surfaces to face in the desired direction and having their first-engaged ends fixed at points closely adjacent the knife and being flexible in a direction transverse of the plane of the knife, and means for altering the position of the last-engaged portions of the deflectors in directions transverse to the plane of the knife to thereby change the curvature of the deflectors to control the angle at which different sizes of fruit halves enter said paths.

5. A device for picking fruit halves from a knife and delivering them to a predetermined path of movement including, a stationary member, a flexible member secured at one end to said stationary member and curved away from the plane of the knife, and means for altering the position of the opposite end of said flexible member in a direction transverse of the plane of the knife to change the curvature of said flexible member and control the angle at which the fruit halves enter said path.

6. A device for picking fruit halves from a knife and delivering them to a predetermined path of movement including, a stationary member having a bevelled portion closely adjacent the plane of the knife, a flexible member secured at one end to said stationary member and curved away from the plane of the knife, and means for altering the position of the opposite end of said flexible member in a direction transverse of the plane of the knife to change the curvature of said flexible member and control the angle at which the fruit halves enter said path.

7. A device for picking fruit halves from a knife and delivering them to a predetermined path of movement including, a stationary member having a portion closely adjacent the plane of the knife, a flexible member secured at one end to said portion and curved away from the plane of the knife, a link pivoted to the flexible member at a point spaced from said end, and means for securing said link in different positions with respect to said stationary member in a manner to alter the curvature of said flexible member and control the angle at which said fruit halves enter said path.

8. A device for cutting fruit comprising, a rotary knife, a stationary trough extending at a substantial angle with the axis of the knife, said trough being inclined toward the knife for causing the fruit to move into contact with the knife, said trough having at least that portion of its surface, which is engaged by the fruit upon its initial contact with said knife, roughened, said roughening serving to check rotation of the fruit in response to contact with the knife but leaving the fruit free to traverse the trough, said roughened surface consisting of a plurali- 9. In a device for handling cut fruit, means forming a channel adapted to receive the fruit, said means comprising a stationary member for carrying the fruit and a deflector for engaging the cut face of the fruit as it enters the channel, said member being inclined to cause the fruit to advance through the channel by gravity, as well as sloping transversely downwardly toward the deflector, whereby the cut face of the fruit is maintained in engagement with the deflector as the fruit moves through the channel the direction of the face being altered in accordance with the position of that portion of the deflector engaged.

10. In a device for delivering halved fruit into predetermined paths of movement with the cut surfaces of the fruit halves facing in a desired direction, means forming a pair of diverging oppositely curved channels adapted to pass the fruit, means to separate the fruit halves adjacent the beginning of said channels, each of said channels comprising a member for carrying the fruit and a deflector, said member and said deflector cooperating to position the cut surfaces of the fruit halves, and means for adjusting said deflectors with respect to their associated members for altering said channels for different sizes of fruits as well as to control the position of said cut surfaces when the fruit leaves the channels.

LAWRENCE A. FRY.